(12) United States Patent
Becker et al.

(10) Patent No.: US 7,200,818 B2
(45) Date of Patent: Apr. 3, 2007

(54) SYSTEMS AND METHODS FOR MESSAGING IN A MULTI-FRAME WEB APPLICATION

(75) Inventors: Craig Henry Becker, Austin, TX (US); Stewart Earle Nickolas, Austin, TX (US); Wayne Elmo Vicknair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 10/185,779

(22) Filed: Jun. 28, 2002

(65) Prior Publication Data

US 2004/0001089 A1  Jan. 1, 2004

(51) Int. Cl.
*G06F 7/10* (2006.01)
*G06F 13/14* (2006.01)
*G06F 13/00* (2006.01)

(52) U.S. Cl. ............... 715/804; 715/513; 715/738; 715/760; 709/203; 719/329

(58) Field of Classification Search ........... 715/804, 715/513, 760, 733, 738; 719/318, 313, 315, 719/329; 709/203
See application file for complete search history.

(56) References Cited

U.S. PATENT DOCUMENTS

| | | |
|---|---|---|
| 5,956,036 A | 9/1999 | Glaser et al. |
| 6,052,710 A | 4/2000 | Saliba et al. |
| 6,144,991 A | 11/2000 | England |
| 6,199,195 B1 | 3/2001 | Goodwin et al. |
| 6,573,907 B1 | 6/2003 | Madrane ............... 345/719 |
| 6,604,150 B1* | 8/2003 | Gebhart et al. .......... 719/328 |
| 6,640,255 B1 | 10/2003 | Snyder et al. |
| 6,675,193 B1 | 1/2004 | Slavin et al. .............. 709/200 |
| 6,753,886 B1* | 6/2004 | Schuft ................. 715/764 |
| 6,799,301 B1* | 9/2004 | Francis et al. ............ 715/523 |
| 6,802,061 B1 | 10/2004 | Parthasarathy et al. ..... 717/173 |
| 6,826,696 B1 | 11/2004 | Chawla et al. ............ 713/201 |
| 6,845,507 B2* | 1/2005 | Kenton ................. 719/314 |
| 6,889,363 B2 | 5/2005 | Maloney ............... 715/765 |
| 6,889,379 B1* | 5/2005 | Lindhorst et al. ......... 719/316 |
| 6,915,454 B1 | 7/2005 | Moore et al. ............. 714/38 |

(Continued)

OTHER PUBLICATIONS

Antonio Garcia, "The Visitor Design Pattern," available via the Internet at http://exciton.cs.oberlin.edu/javaresources/DesignPatterns/VisitorPattern.html, pp. 1-2, printed Jun. 19, 2002.

(Continued)

*Primary Examiner*—Raymond J. Bayerl
*Assistant Examiner*—Namitha Pillai
(74) *Attorney, Agent, or Firm*—Robert C. Ruimk; Barry S. Newberger; Jeffrey S. LaBaw (57) ABSTRACT

A method, computer program product and system for handing messages in a Web application. Messages in a Web application may be handled by inserting a writeable block in a window in a first page of the Web application where the writeable block for receiving a message may be generated by the Web application. In a second page of the Web application, a message script may be inserted if a message is generated by the Web application for display in response to an execution of the second page. In response to the message script, the message handler is invoked.

16 Claims, 7 Drawing Sheets

U.S. PATENT DOCUMENTS

| | | | |
|---|---|---|---|
| 6,961,929 | B1 | 11/2005 | Pelegri-Llopart et al. |
| 2001/0037490 | A1 | 11/2001 | Chiang |
| 2001/0047402 | A1 | 11/2001 | Saimi et al. |
| 2002/0054137 | A1* | 5/2002 | Dvorak .................... 345/804 |
| 2002/0184145 | A1* | 12/2002 | Sijacic et al. ............. 705/40 |
| 2003/0226107 | A1 | 12/2003 | Pelegri-Llopart et al. |
| 2004/0049574 | A1 | 3/2004 | Watson et al. |

OTHER PUBLICATIONS

John Clements, "Lecture 12: The Visitor Pattern," Oct. 13, 1998, available via the Internet at http://www.cs.rice.edu/-clements/312/10-13, pp. 1-4.

Brown, "Encapsulate reusable functionality in JSP tags", JavaWorld, Aug. 2000, pp. 1-7. http://www.javaworld.com/javaworld/jw-08-2000-jw-0811-jstags_p.html, retrieved Dec. 15, 2005.

Lerner, "At the Forge: Custom JSP Actions", Linux Journal, Jul. 2001, pp. 1-7.

Jakarta Project: 10 Tag library: Tags for working with FTP, HYYP, HTTPS, XML-RPC and SOAP, Version 1.0, Mar. 2000, pp. 1-13, http://jakarta.apache.org/taglibs/doc/io-doc.

Ivan Marsic, Chapter 2 "Design Patterns and Software Components," *Software Engineering of Web Applications*, available via the Internet at http://www.caip.rutgers.edu/-marsic/Teaching/SEW/title.html, 20 pp.

Erich Gamma et al., "Design Patterns—Elements of Reusable Object-Oriented Software," pp. 331-344.

Aranha et al., "Web Service Acceptance Tests and Code Generation", Proceedings of Workshop on Testing in XP WtiXP 2002, May 2002, Italy, pp. 1-59. http://www.cwl.nl/wtlxp2002.

"JavaScript Language Specification", JavaScript 1.1, Oct. 3, 1996. pp. 1-107.

* cited by examiner

SYSTEMS AND METHODS FOR MESSAGING IN A MULTI-FRAME WEB APPLICATION

CROSS-REFERENCE TO RELATED APPLICATIONS

Related subject matter may be found in the following commonly assigned, copending U.S. patent applications, which are hereby incorporated by reference herein:

Ser. No. 10/184,330, entitled "SYSTEMS AND METHODS FOR TRANSPARENTLY ACCESSING WEB APPLICATIONS REMOTELY AND LOCALLY";

Ser. No. 10/185,796, entitled "SYSTEMS AND METHODS FOR ACCESSING WEB SERVICES USING A TAG LIBRARY"; and Ser. No. 10/184,255, entitled "SYSTEMS AND METHODS FOR DISPLAYING AND EXECUTING WEB SERVICES IN MULTIPLE CONTENT DOMAINS".

TECHNICAL FIELD

The present invention is related in general to data processing systems, and in particular, to data processing systems for distributed data processing via a network in which a multiframe Web application may generate, in response to a request targeted to a first frame, a message, such as an error message, that may be targeted to a second frame.

BACKGROUND INFORMATION

The advent of networked data processing systems, and, particularly, the network of networks referred to as the Internet, has spurred the introduction of distributed data processing services. In such systems, a client, typically remotely connected to the service provider via one or more networks, accesses a software application implemented on the remote data processing system which returns the results of the data processing activity to the client. It has become common to use the services represented by the World Wide Web (WWW) with its graphical user interface (GUI) orientation to provide the interface to such applications, which may be referred to a Web applications.

Typically, in such distributed processing systems, the client sends a request to the server. The request may include one or more parameters which may be inputs to the particular service requested. On the server side, the system builds a Web page for returning the response to the requesting client. The server accesses a server page containing code that defines the Web page. Embedded in the code for generating the page, i.e. HTML script, is code that is executable by the server to generate the necessary HTML script to display the results on the client machine.

A Web browser running on the client machine is an application that can interpret the response HTML and display the page on a conventional display such as a CRT monitor connected to the client machine. Commercially available Web browsers include Netscape Navigator®, Mozilla, Internet Explorer®, iCab, and Opera. Technologies for implementing distributed computing services in this way include Active Server Pages (ASP) and Java™ Server Pages (JSP). Additionally, such services may access server-side application software to perform some or all of the requested tasks via an environment-independent interprocess communication application program interface (API) such as DCOM (Distributed Component Object Model), CORBA (Common Object Request Broker Architecture) or Remote Method Invocation (RMI). In response to execution of the page by the browser, the application software generates dynamic data and returns the data to the client which then displays the data in accordance with the code defining the page.

An example of such an application might be a Web application that handles employee travel reporting. Such a Web application may include multiple interfaces constituting multiple frames or windows, for the display of output from the Web application, as well as entry of input data. The Web application may return a response to the user targeted to a frame specified in the request. In other words, the target frame or window for the response is specified when the request is initiated. It would be recognized by those of ordinary skill in the art that, for the purposes herein, there is no material distinction between a multiwindow document and a multiframe document. The term "multiframe" may be used to refer to both a multiframe document and a multi-window document, generally, and frame or window may be used to collectively refer to a frame or windows. However, the Web application may generate a message, such as an error message, that should be targeted to a different frame, for example an error log. Because the target is specified when the request is initiated, it is problematic to retarget the response if the server-side processing encounters an error or other exception whereby a message is to be returned in a response to the client.

Thus, there is a need in the art for systems and methods for handling messages in a multiframe or multiwindow Web application.

SUMMARY OF THE INVENTION

The problems outlined above may at least in part be solved in some embodiments by handling messages in a multiframe or multiwindow Web application. In one embodiment of the present invention, a method for handling messages in a Web application may comprise the step of inserting a message handler in a top level document of the Web application. The method may further comprise the step of inserting a writeable block in a window in a first page of the Web application where the writeable block for receiving a message may be generated by the Web application. The method may further comprise the step of inserting a message script in a second page of the Web application if a message is generated by the Web application for display in response to an execution of the second page. In response to the message script, the message handler is invoked.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2.1 and 2.2 illustrate multiframe and multiple page window pages which may be used in conjunction with the present invention;

DETAILED DESCRIPTION

In the following description, numerous specific details are set forth to provide a thorough understanding of the present invention. For example, exemplary code for accessing particular Web applications may be described, however it would be recognized by those of ordinary skill in the art that the present invention may be practiced without such specific details, and in other instances, well-known circuits have been shown in block diagram form in order not to obscure the present invention in unnecessary detail. Refer now to the drawings wherein depicted elements are not necessarily shown to scale and wherein like or similar elements are designated by the same reference numeral through the several views.

Figure 1:
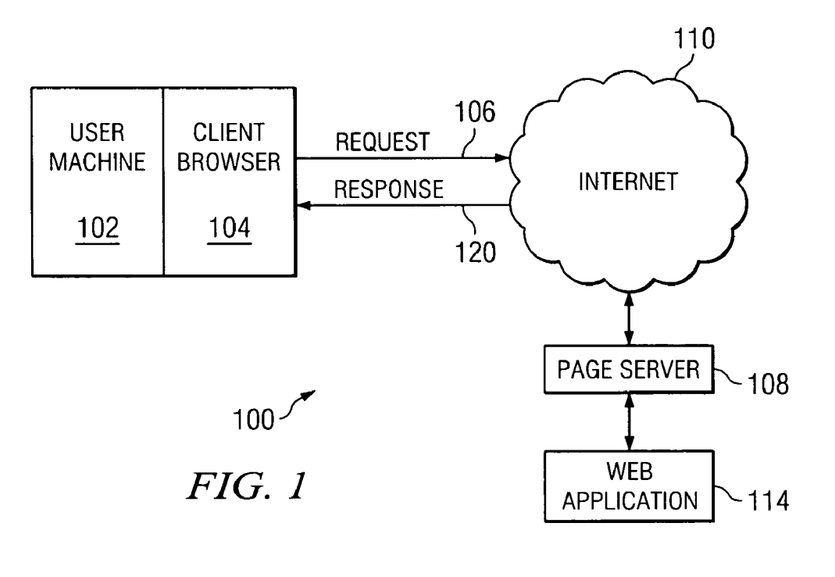
FIG. 1 illustrates a network architecture for providing Web applications which may be used in conjunction with the present invention.

Referring to FIG. 1, there is illustrated a distributed data processing system architecture 100 which may be used for accessing Web applications in accordance with the present inventive principles. A Web application may be accessed when a request for a web document, or page, is received from a user machine, such as user machine 102, running a client web browser 104. Client browser 104 initiates a request 106, which is transmitted to the targeted web server, illustrated by page server 108, in FIG. 1, via a network, shown in FIG. 1 as Internet 110.

Page server 108 responds to the request by returning the requested page in response 120. The requested page may include data that is to be generated dynamically. Dynamic data may be generated by web application 114 and the result incorporated in the page returned in response 120 to client browser 104, which displays the data in accordance with the code defining the page, which may be, for example, an HTML (Hypertext Markup Language) script.

Figure 3:
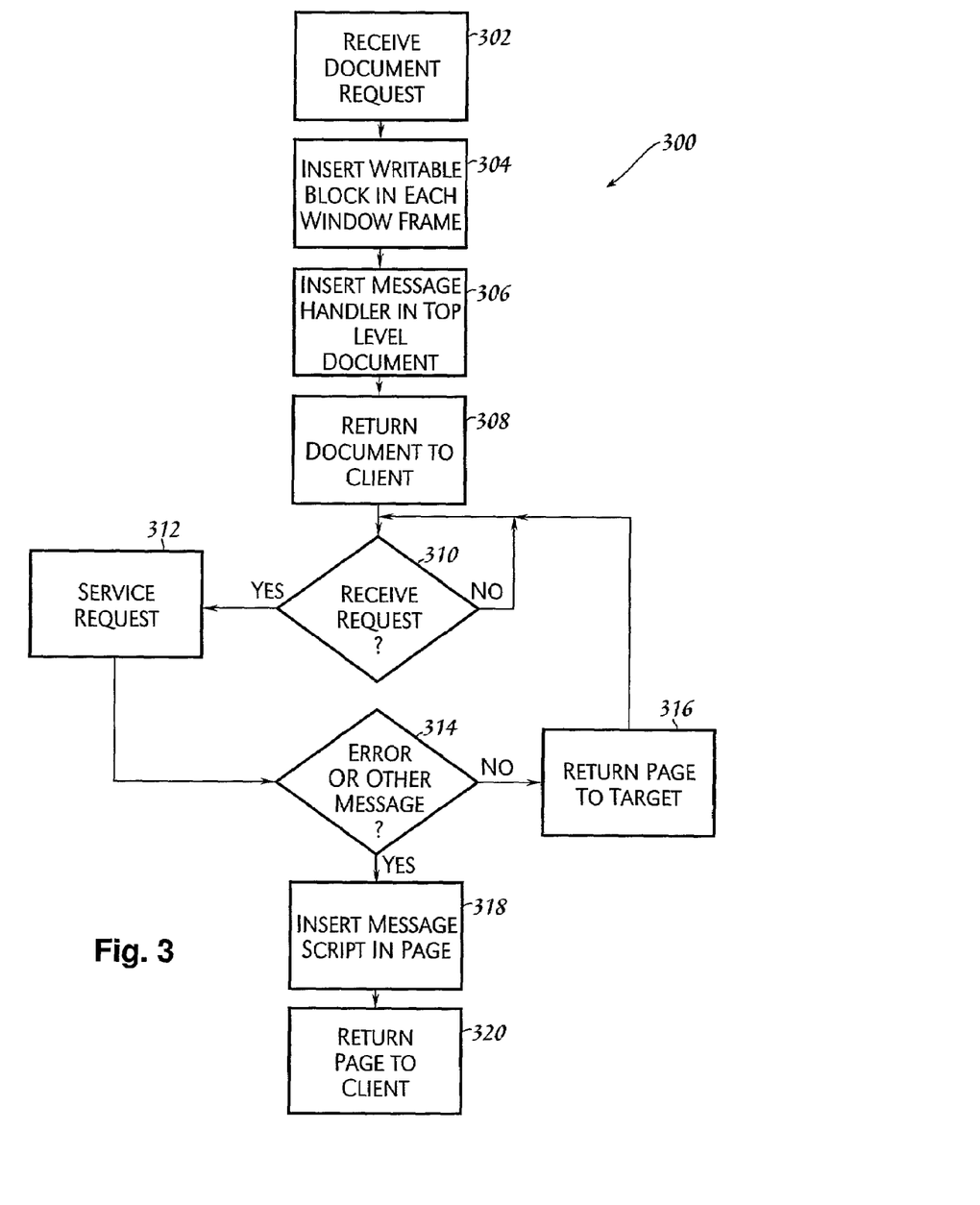
FIG. 3 illustrates, in flow chart form, a methodology for returning messages in accordance with the present inventive principles.

Additionally, as described further in conjunction with FIG. 3, a Web application may be deployed locally. A mechanism for transparently accessing such a client-resident web application is described in the commonly owned, copending U.S. patent application entitled "Systems And Methods for Transparently Accessing Web Applications Remotely And Locally," Ser. No. 10/184,330, which is hereby incorporated by reference.

Figure 21:
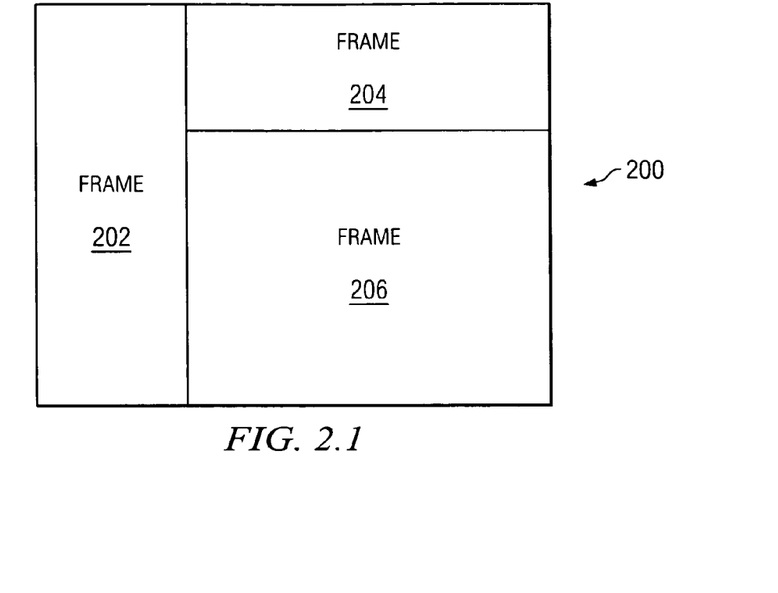
Figure 22:
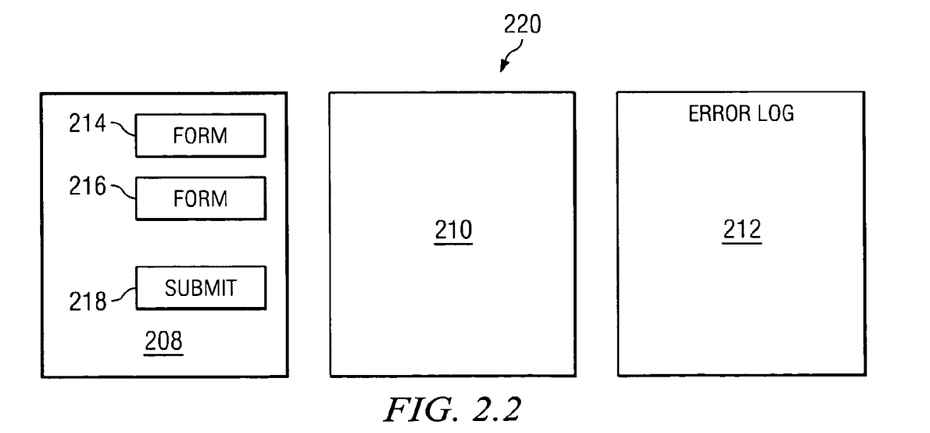

Refer now to FIGS. 2.1 and 2.2 illustrating, respectively, a multiframe page 200 and a multiple window page 220. As previously discussed, from the perspective of the present inventive principles, a multiframe window and a multiple window document would be recognized to be the same. However, to appreciate the present invention, it is useful to describe both, which may be viewed as alternative embodiments of a Web application document in accordance with the present invention.

Multiframe page 200 depicts a page having three frames, frame 202, 204 and 206. One of ordinary skill in the art would understand that a three-frame page is exemplary and that the present invention is not limited to such pages, and alternative embodiments may include any number of frames and these embodiments would fall within the spirit and scope of the present invention. The contents of a particular frame or window depend on the Web application. For example, if page 200 belongs to an application for exploring a Web application document, frame 202 may be a tree frame depicting a DOM (Document Object Model) representation of the Web application page (not shown in FIG. 2.1). The DOM is discussed further below. A Web application for exploring Web services is described in the commonly-owned, copending U.S. Patent Application entitled "Systems And Methods For Displaying And Executing Web Services In Multiple Content Domains," Ser. No. 10/184,255, which is hereby incorporated herein by reference. Similarly, in this context frame 204 may represent an attribute frame for displaying the attributes (not shown in FIG. 2.1) associated with a node in the DOM tree. The user may request the attributes associated with one of the nodes from the Web application, wherein the Web application returns a dynamically generated page in response 120, as generically described in conjunction with FIG. 1. Note that the target frame, in this example, frame 204, may be specified in the request, whereby the page server may incorporate the script for the response into the page to be returned to the client. On rendering the page, the requested attribute may be displayed in a corresponding frame, such as frame 204. Frame 206 may display messages sent from the Web application, such as error messages, in accordance with the principles of the present invention, and described further in conjunction with FIGS. 3–5. As discussed below, the present inventive principles operate to target the error or other message generated by the Web application to the message frame, notwithstanding the target specified in the request 106.

Multiwindow page 220 includes window A 208, window B 210 and window C 212. One of ordinary skill in the art would understand that a three-windowed page is exemplary and that the present invention is not limited to such a page, and alternative embodiments may include any number of windows, and these embodiments would fall within the spirit and scope of the present invention. The contents of a particular frame depend on the Web application. In the exemplary illustration, window A 208 may represent a form page including forms 214 and 216 for entry of user-supplied data, which may serve as input data to the Web application. (An artisan of ordinary skill would recognize that other numbers of forms may be included, and the two forms shown in window A are exemplary.) The form data may be submitted in a request sent to the Web application by user-activation of submit "button" 218. The response (not shown in FIG. 2.2) may be displayed in window B 210, which may represent the target window specified in the request. Additionally, in accordance with the present invention, window C 212 may represent an error log, and may display error messages returned by the Web application, in similar fashion to frame 206, of FIG. 2.1.

The flowcharts provided herein are not necessarily indicative of the serialization of operations being performed in an embodiment of the present invention. Steps disclosed within these flowcharts may be performed in parallel. The flowcharts are indicative of those considerations that may be performed to produce the operation available for messaging in multiframe Web pages. It is further noted that the order presented is illustrative and does not necessarily imply that the steps must be performed in the order shown.

Refer now to FIG. 3 illustrating in flowchart form, methodology 300 for returning messages to a client in a Web application data processing system. Methodology 300 may return a message to the requesting client in response to a request for a Web application page received in step 302.

In each window which may be, for example, a frame, a writeable block is inserted, step 304. In a page represented as an HTML document, a writeable block may be delimited by <DIV> </DIV> tags and the DIV element may have a predetermined identifier, such as "msgdiv".

In step 306 a message handler is inserted in a top level document of the Web application page. In a page represented as an HTML document, a message handler may be implemented by a Javascript function call. An exemplary Javascript function may be defined by:

```
function chainMessageWindow(str) {
    obj = messagewindow.document.all.msgdiv.innerHTML = str;
}.
```

In this exemplary message handler, innerHTML is a Document Object Model (DOM) method that specifies a string to be replaced between tags. The object corresponds to the writeable block discussed in conjunction with step 304, "msgdiv". The name of the frame or window into which the message will be written is "messagewindow."

As previously discussed, a Web application page may elicit a further request from the client requesting the page. As the previous examples demonstrate, the nature of further requests may depend on the Web application, and the application running on the client, which itself may be represented as a script executed by a Web browser. If a request is received step 310 then in step 312 the request is serviced. If the request is serviced without error and the Web application generates no other message to be displayed in a frame or window other than the frame or window targeted in the request, step 314, then the response page is returned in step 316.

Conversely, if in step 314 an error generating an error message has occurred or otherwise the Web application has generated a message that is to be targeted to a frame/window different from the target specified in the request received in step 310, step 314 proceeds by the "Yes" branch. In step 318, a message script is inserted in the page. An exemplary script may be:

<script>top.chainMessageWindow('<b>Error Message</b>');</script>.

The script invokes the message handler, chainMessagewindow, as described hereinabove, with the string argument '<b>Error Message</b>'. On execution of the script by the client browser, the message window would display Error Message. Note that the message need not necessarily be an error message. Other types of messages that might be sent include warning messages, or informational messages. The present inventive principles are applicable to any information the Web application passes to the client in addition to the requested response, and it would be appreciated by those of ordinary skill in the art that such embodiments would fall within the spirit and scope of the present invention.

In step 320 the page is returned to the client, wherein the page also includes any response generated in servicing the request.

Figure 4:
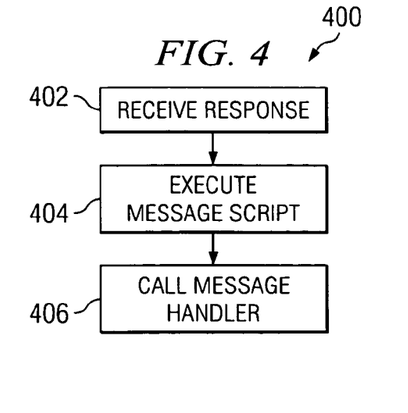
FIG. 4 illustrates, in flow chart form, a methodology for handling messages in accordance with the present inventive principles.

Refer now to FIG. 4 illustrating in flowchart form, methodology 400 for handling a message returned in a page generated in accordance with the methodology of FIG. 3. In step 402 the page is received, and in step 404 a message script, such as the message script inserted in step 318 of FIG. 3, is executed. In response thereto, in step 406, a message handler is called. The message handler may be the message handler inserted into the top level document in step 306 of FIG. 3.

Figure 5:
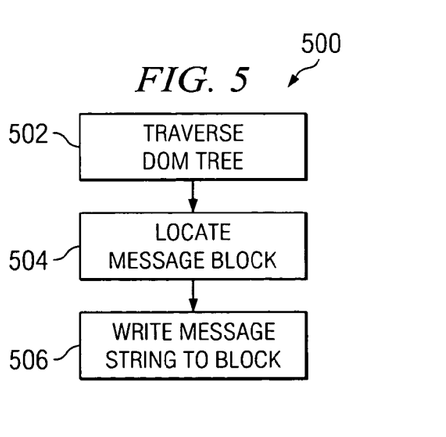
FIG. 5 illustrates, in block diagram form, a data processing system for handling messages in accordance with an embodiment of the present invention.
Figure 6:
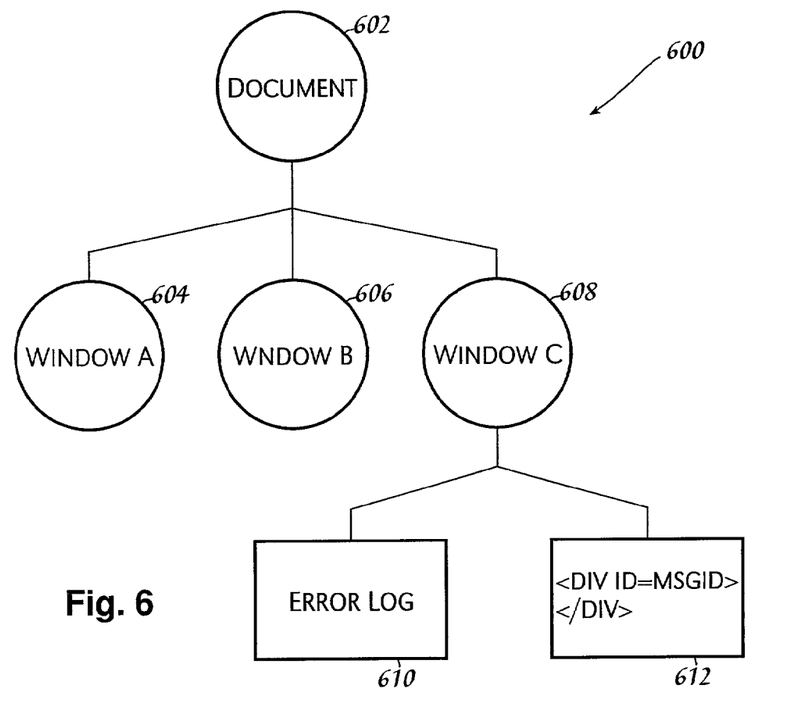
FIG. 6 illustrates, in block diagram form, a data processing system for returning messages from a Web application in accordance with an embodiment of the present invention.

In response to the invocation of the message handler, process 500, of FIG. 5 may be performed. Process 500 may be performed in conjunction with a Web page comporting with the DOM. The DOM is a standardized programming API to the structure of documents. The DOM is a logical model of a document, which may be represented in a tree-based fashion. (The DOM is promulgated by the W3C. Document Object Model (DOM) Specification Level 1 maybe found at http://www.w3.org/TR/REC-DOM-Level-1.) In step 502, the DOM tree of the page may be traversed. In the DOM, a tree representation of the page is generated. The DOM may be generated by the browser, for example by parsing the received HTML into a tree of elements corresponding to elements of the HTML page. Referring now to FIG. 6, there is illustrated an exemplary DOM tree representation corresponding to Web page 220 of FIG. 2.2. The top level node 602 is the document node. Descending from the top level node are three nodes, 604, 606 and 608 representing, respectively, windows A, B and C. Below node 608 are two sub-nodes, 610 and 612 corresponding to elements in the window. Thus, for example, node 610 may correspond to the title "Error Log" displayed in window C 212 of FIG. 2.2. Node 612 may correspond to the writeable block "msgid".

Returning to FIG. 5, in step 504 the writeable block is located. Thus, in the exemplary tree in FIG. 6, node 612 representing the writeable block, msgid, may be located in step 504. In step 506 the error message string or other message string corresponding to the message generated by the Web application to be displayed in the frame or window is written to the writeable block.

Figure 7:
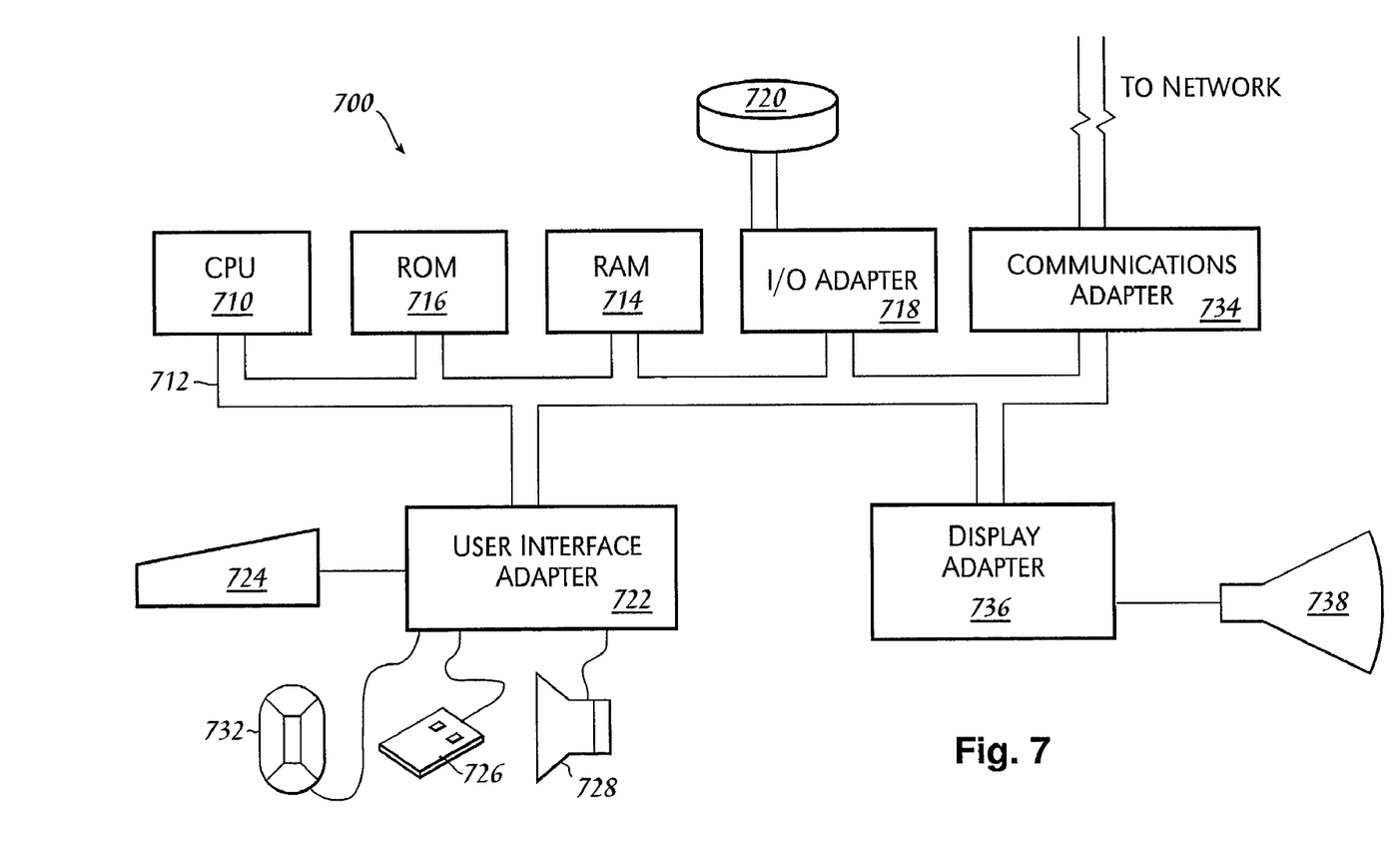
FIG. 7 illustrates, in block diagram form, a hardware configuration of a data processing system in accordance with an embodiment.

A representative hardware environment for practicing the present invention is depicted in FIG. 7, which illustrates an exemplary hardware configuration of data processing system 700 in accordance with the subject invention. For example, browser client 104, FIG. 2 may be implemented in accordance with data processing system 700. System 700 includes central processing unit (CPU) 710, such as a conventional microprocessor, and a number of other units interconnected via system bus 712. System 700 includes random access memory (RAM) 714, read only memory (ROM) 716, and input/output (I/O) adapter 718 for connecting peripheral devices such as disk drive 720 to bus 712, user interface adapter 722 for connecting keyboard 724, mouse 726, and/or other user interface devices such as a touch screen device (not shown) to bus 712. System 700 also includes communication adapter 734 for connecting system 700 to a data processing network enabling the system to communicate with other systems, and display adapter 736 for connecting bus 712 to display device 738. CPU 710 may include other circuitry not shown herein, which will include circuitry commonly found within a microprocessor, e.g., execution unit, bus interface unit, arithmetic logic unit, etc. CPU 710 may also reside on a single integrated circuit.

Display device 738 is connected to system bus 712 by display adapter 736. In this manner, a user is capable of inputting to the system through the keyboard 724, trackball 732 or mouse 726 and receiving output from the system via speaker 728, and display device 738.

Preferred implementations of the invention include implementations as a computer system programmed to execute the method or methods described herein, and as a computer program product. According to the computer system implementation, sets of instructions for executing the method or methods are resident in the random access memory 714 of one or more computer systems configured generally as described above. These sets of instructions, in conjunction with system components that execute them display messages in a multiframe/multiwindow Web application. Until required by the computer system, the set of instructions may be stored as a computer program product in another computer memory, for example, in disk drive 720 (which may include a removable memory such as an optical disk or floppy disk for eventual use in the disk drive 720). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 8:
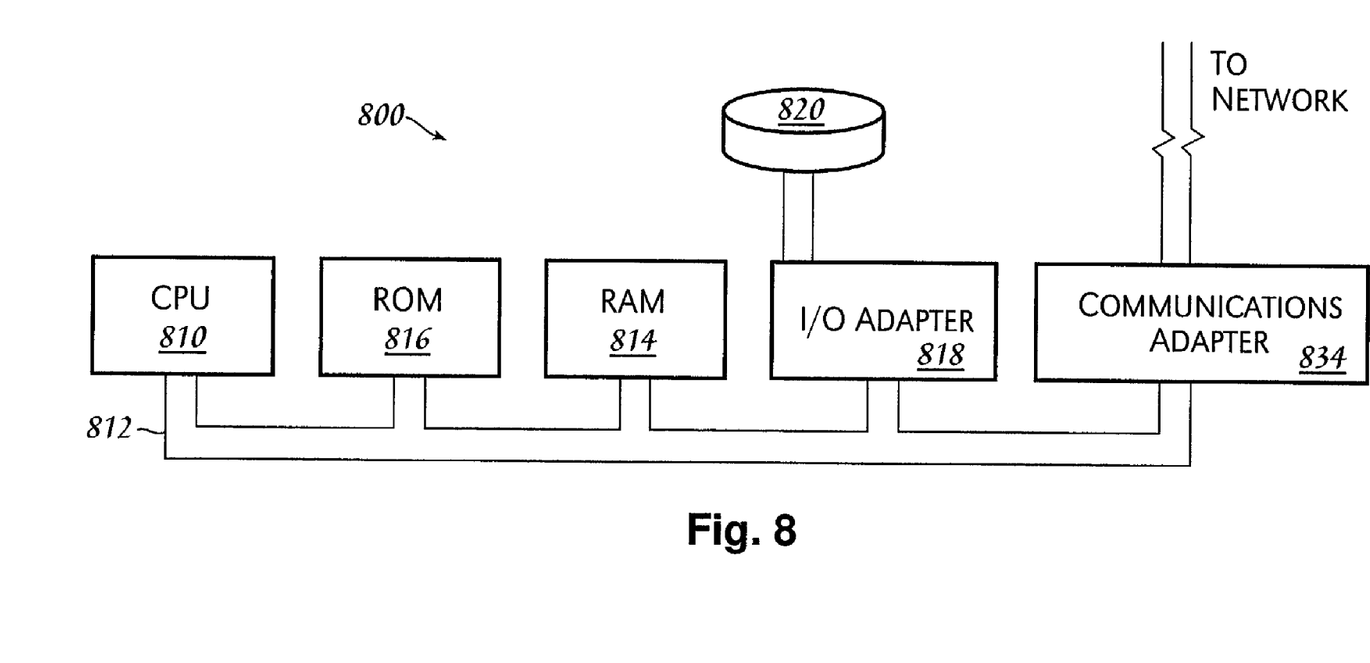
FIG. 8 illustrates, in block diagram form, a hardware configuration of a data processing system in accordance with an embodiment.

Similarly, a representative hardware environment for practicing the methodology of FIG. 5 in accordance with the present invention is depicted in FIG. 8. For example, page server 108 FIG. 1, may be implemented in accordance with data processing system 800. FIG. 8 illustrates an exemplary hardware configuration of data processing system 800 in accordance with the subject invention having central processing unit (CPU) 810, such as a conventional microprocessor, and a number of other units interconnected via system bus 812. Data processing system 800 includes random access memory (RAM) 814, read only memory (ROM) 816, and input/output (I/O) adapter 818 for connecting peripheral devices such as disk units 820 to bus 812. System 800 also includes communication adapter 834 for connecting data processing system 800 to a data processing network enabling the data processing system to communicate with other systems. CPU 810 may include other circuitry not shown herein, which will include circuitry commonly found within a microprocessor, e.g., execution unit, bus interface unit, arithmetic logic unit, etc. CPU 810 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 814 of one or more computer systems configured generally as described above.

These sets of instructions in conjunction with the system components that execute them may generate a Web page incorporating a dispatch function and IPC bridge in accordance with the present inventive principles. A methodology for generating such a Web page is described in the commonly owned, concurrently filed U.S. patent application entitled "Systems And Methods For Defining Web Application Pages," Ser. No. 10/294,941, which is hereby incorporated herein by reference. Until required by the computer system, the set of instructions may be stored as a computer program product in another computer memory, for example, in disk units 820, which may include a removable memory such as an optical disk or floppy disk. Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change maybe electrical, magnetic, chemical, biological, or some other physical change. While it is convenient to describe the invention in terms of instructions, symbols, characters, or the like, the reader should remember that all of these and similar terms should be associated with the appropriate physical elements.

Although the present invention and its advantages have been described in detail, it should be understood that various changes, substitutions and alterations can be made herein without departing from the spirit and scope of the invention as defined by the appended claims.

What is claimed is:

1. A method of handling messages from a Web application at a Web server to a client browser at a user machine comprising:
   inserting a message handler in a top level document of the Web application;
   inserting a writeable block in a first window in a first page of the Web application, the writeable block for receiving a message generated by the Web application, the message to be received while servicing a Web application request from the client browser at the user machine to produce a response to the Web application request, wherein the message is in addition to the response;
   receiving at the Web server a Web application request for a second page of the Web application;
   generating the second page;
   determining if the message is generated by the Web application while servicing the Web application request;
   responsive to a determination that the message is generated, inserting a message script in a second window of the second page of the Web application, wherein the message handler is invoked in response to the message script; and
   returning the second page to the client browser on the user machine, wherein the second page includes the response to the Web application request and the message, if the message is generated.

2. The method of claim 1 wherein the message handler targets the first window in the first page of the Web application.

3. The method of claim 2 wherein the message handler is operable for writing a message string representing the message generated by the Web application in the writeable block, and wherein the writeable block is contained in the first window in the second page of the Web application.

4. The method of claim 2 wherein the message handler is operable for traversing a logical model of Web application documents, the message handler locating the writeable block in the first window in response to the traversing of the logical model.

5. The method of claim 4 wherein the logical model of the Web application documents comprises a Document Object Model.

6. A computer program product embodied in a machine-readable storage medium for handling messages from a Web application at a Web server to a client browser at a user machine, the program product comprising programming instructions for performing the steps of:
  inserting a message handler in a top level of the Web application;
  inserting a writeable block in a first window in a first page of the Web application, the writeable block for receiving a message generated by the Web application, the message to be received while servicing a Web application request from the client browser at the user machine to produce a response to the Web application request, wherein the message is in addition to the response;
  receiving at the Web server a Web application request for a second page of the Web application;
  generating the second page;
  determining if the message is generated by the Web application while servicing the Web application request;
  responsive to a determination that the message is generated, inserting a message script in a second window of the second page of the Web application, in response to an execution of the second page, wherein the message handler is invoked in response to the message script; and
  returning the second page to the client browser on the user machine, wherein the second page includes the response to the Web application request and the message, if the message is generated.

7. The program product of claim 6 wherein the message handler targets the first window in the first page of the Web application.

8. The program product of claim 7 wherein the message handler is operable for writing a message string representing the message generated by the Web application in the writeable block, and wherein the writeable block is contained in the first window in the second page of the Web application.

9. The program product of claim 7 wherein the message handler is operable for traversing a logical model of Web application documents, the message handler locating the writeable block in the first window in response to the traversing of the logical model.

10. The program product of claim 9 wherein the logical model of the Web application documents comprises a Document Object Model.

11. A data processing system for handling messages from a Web application at a Web server to a client browser at a user machine comprising:
  circuitry operable for inserting a message handler in a top level document of the Web application;
  circuitry operable for inserting a writeable block in a first window in a first page of the Web application, the writeable block for receiving a message generated by the Web application, the message to be received while servicing a Web application request from the client browser at the user machine to produce a response to the Web application request, wherein the message is in addition to the response;
  circuitry operable for receiving at the Web server a Web application request for a second page of the Web application;
  circuitry operable for generating the second page;
  circuitry operable for determining if the message is generated by the Web application while servicing the Web application request;
  circuitry operable for, responsive to a determination that the message is generated, inserting a message script in a second window of the second page of the Web application, in response to an execution of the second page, wherein the message handler is invoked in response to the message script; and
  circuitry operable for returning the second page to the client browser on the user machine, wherein the second page includes the response to the Web application request and the message, if the message is generated.

12. The system of claim 11 wherein the message handler targets the first window in the first page of the Web application.

13. The system of claim 12 wherein the message handler is operable for writing a message string representing the message generated by the Web application in the writeable block, and wherein the writeable block is contained in the first window in the second page of the Web application.

14. The system of claim 12 wherein the message handler is operable for traversing a logical model of Web application documents, the message handler locating the writeable block in the first window in response to the traversing of the logical model.

15. The system of claim 14 wherein the logical model of the Web application documents comprises a Document Object Model.

16. A method of handling messages from a Web application at a Web server to a client browser at a user machine comprising:
  inserting a message handler in a top level document of the Web application;
  inserting a writeable block in a first window in a first page of the Web application, the writeable block for receiving a message generated by the Web application, the message to be received while servicing a Web application request from the client browser at the user machine to produce a response to the Web application request, wherein the message is in addition to the response;
  receiving at the Web server a Web application request for a second page of the Web application;
  generating the second page;
  determining if the message is generated by the Web application while servicing the Web application request;
  responsive to a determination that the message is generated, inserting a message script in a second window of the second page of the Web application, wherein the message handler is invoked in response to the message script, wherein the message handler targets the first window in the second page of the Web application, the message handler being operable for writing a message string representing the message generated by the Web application in the writeable block, and wherein the writeable block is contained in the first window in the second page of the Web application; and returning the second page to the client browser on the user machine, wherein the second page includes the response to the Web application request and the message, if the message is generated.

* * * * *